US008217249B2

(12) United States Patent
Hiraku et al.

(10) Patent No.: US 8,217,249 B2

(45) Date of Patent: Jul. 10, 2012

(54) ACOUSTIC TIMBER FOR MUSICAL INSTRUMENT

(75) Inventors: Tatsuya Hiraku, Hamamatsu (JP); Hiroyasu Abe, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 383 days.

(21) Appl. No.: 12/703,697

(22) Filed: Feb. 10, 2010

(65) Prior Publication Data

US 2010/0199831 A1 Aug. 12, 2010

(30) Foreign Application Priority Data

Feb. 12, 2009 (JP) ................................ 2009-029843

(51) Int. Cl.
*G10D 3/00* (2006.01)

(52) U.S. Cl. .................................................... 84/452 R

(58) Field of Classification Search .................... 84/267, 84/290, 452 R, 291, 293
See application file for complete search history.

(56) References Cited

U.S. PATENT DOCUMENTS

| | | | | |
|---|---|---|---|---|
| 4,533,589 | A * | 8/1985 | Sewell | 428/174 |
| 5,125,312 | A * | 6/1992 | Fishman et al. | 84/291 |
| 6,197,414 | B1 | 3/2001 | Kawai et al. | |
| 2002/0066354 | A1 | 6/2002 | Schleske | |
| 2006/0042448 | A1 | 3/2006 | Schleske | |
| 2006/0272470 | A1 | 12/2006 | Parker et al. | |

FOREIGN PATENT DOCUMENTS

| | | |
|---|---|---|
| JP | 3581869 | 10/2004 |
| JP | 2005-105245 | 4/2005 |
| JP | 3654900 | 6/2005 |
| JP | 2006-117768 | 5/2006 |
| JP | 2007-196692 | 8/2007 |
| WO | WO-03/034399 A1 | 4/2003 |

* cited by examiner

*Primary Examiner* — Kimberly Lockett

(74) *Attorney, Agent, or Firm* — Dickstein Shapiro LLP

(57) ABSTRACT

An acoustic timber for use in an acoustic musical instrument is constituted of a plurality of woody members, such as woody fibers, woody veneers, blasted bamboo fibers, and defibrated bamboo fibers, whose fiber length is 50 mm or more. An epoxy resin is impregnated into the woody members with an impregnation factor of 5 weight-percent through 50 weight-percent. The woody members impregnated with the epoxy resin are joined together by way of heating and compressive molding so that the fibers thereof are uniformly aligned in the desired fiber-aligning direction.

5 Claims, 1 Drawing Sheet

D1
1
2
2
3
2

ACOUSTIC TIMBER FOR MUSICAL INSTRUMENT

BACKGROUND OF THE INVENTION

1. Field of the Invention

The present invention relates to acoustic timbers for musical instruments. The present invention also relates to manufacturing methods of acoustic timbers and musical instruments composed of acoustic timbers.

The present application claims priority on Japanese Patent Application No. 2009-29843, the content of which is incorporated herein by reference.

2. Description of the Related Art

Conventionally, natural timbers such as granadilla have been used as acoustic timbers for use in musical instruments such as clarinets.

However, natural timbers as acoustic timbers for musical instruments have the following problems.

(1) Natural timbers are natural resources which could be exhausted in the future, and the use of natural timbers could have a heavy impact on the environment.
(2) It takes a long time between logging and cutting.
(3) Natural timbers vary in hardness and specific gravity, which in turn causes dispersions in sound quality.
(4) Cracks and fractures may easily occur in natural timbers since they are expanded and contracted in shape due to variations of humidity.
(5) Rare timbers such as granadilla in particular are very expensive.

Various acoustic timbers have been developed and disclosed in various documents, such as Patent Documents 1-5, which disclose composite timbers. However, composite timbers artificially developed produce sounds with different quality compared to natural timbers. In actuality, it is difficult to substitute composite timbers for natural timbers in manufacturing musical instruments.

Patent Document 1: Japanese Patent No. 3654900 (corresponding to International Publication No. WO 94/17971)

Patent Document 2: Japanese Patent No. 3581869

Patent Document 3: Japanese Patent Application Publication No. 2005-105245

Patent Document 4: Japanese Patent Application Publication No. 2006-117768

Patent Document 5: Japanese Patent Application Publication No. 2007-196692

SUMMARY OF THE INVENTION

It is an object of the present invention to provide an acoustic timber yielding as good a sound quality as natural timbers.

It is another object of the present invention to provide a manufacturing method of the acoustic timber.

It is a further object of the present invention to provide a musical instrument composed of the acoustic timber.

An acoustic timber according to the present invention is constituted of a plurality of woody members including fibers with a fiber length of 50 mm or more. An epoxy resin is impregnated into the woody members with the impregnation factor of 5 weight-percent through 50 weight-percent. The woody members impregnated with the epoxy resin are joined together such that the fibers thereof are uniformly aligned in a desired fiber-aligning direction.

The woody members are each composed of woody fibers, a woody veneer, blasted bamboo fibers, or defibrated bamboo fibers.

In the manufacturing method according to the present invention, the woody members whose fiber length is 50 mm or more are impregnated with an unhardened epoxy resin with the impregnation factor of 5 weight-percent through 50 weight-percent, wherein the fibers thereof are uniformly aligned in the desired fiber-aligning direction. Then, the woody members are subjected to heating and compressive molding in the molding equipment, thus producing the acoustic timber.

An acoustic musical instrument is produced by cutting the above acoustic timber.

Since the woody members are joined together such that the fibers thereof are uniformly aligned in the desired direction, it is possible to achieve good anisotropy as natural timbers, thus yielding good sound quality and good tone color as natural timbers. Due to the impregnation of the epoxy resin into the woody members, it is possible to achieve high adhesive strength, high acoustic velocity, and a low underdamping factor. In addition, it is possible to reduce variations of dimensions due to the absorption and desorption of moisture in the acoustic timber.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENTS

Figure 1:
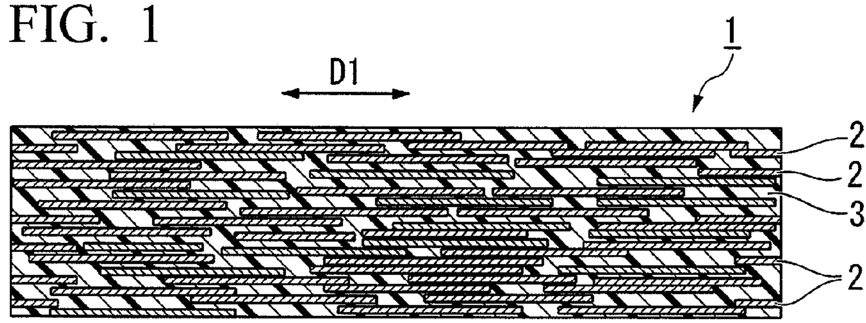
FIG. 1 is a cross-sectional view of an acoustic timber including woody fibers according to a first embodiment of the present invention.

The present invention will be described in further detail by way of examples with reference to the accompanying drawings.

An acoustic timber according to the present invention is a composite timber composed of timbers joined using an epoxy resin. Herein, timbers are composed of woody fibers whose fiber-aligning directions are uniformly aligned with musical instruments.

Specifically, timbers are exemplified in woody fibers or woody veneers in which fiber lengths are set to 50 mm or more. As woody fibers, it is possible to use fiber-processed natural timbers, such as hemp fibers, kenaf fibers, jute fibers, defibrated bamboos, and blasted bamboo fibers. Blasted bamboo fibers are prepared in such a way that bamboo tips having desired cutting lengths are put into an airtight pressure chamber and are then subjected to a pressurization and heating process in a steam atmosphere at the temperature of 140° C. through 200° C. under the pressure of 0.36 MPa through 1.55 MPa, for example. Thereafter, the pressure chamber is opened so as to blast the bamboo tips, which thus form fibers. The average diameter of blasted bamboo fibers ranges from 0.1 mm to 1 mm and preferably ranges from 0.1 mm to 0.5 mm. As woody veneers, it is preferable to use veneers extracted from natural timbers such as granadilla, birch, spruce, maple, Japanese oak, Melan arch, ash, poplar, bubinga, mahogany, zelkova, kapur, and beech.

Timbers with the fiber length of 50 mm or more can be uniformly aligned with each other in the fiber-aligning direction so as to achieve good anisotropy as natural timbers. Timbers with a fiber length less than 50 mm are hardly aligned in the fiber-aligning direction, so that they may hardly achieve anisotropy. Herein, it is not necessary to uniformly set the fiber length of the timbers because the present invention simply requires a fiber length of 50 mm or more. In this connection, the fiber length of each woody veneer may agree with the entire length of each woody veneer along its fiber-aligning direction. In addition, the fiber length of each woody fiber may agree with the entire length of each woody fiber.

An epoxy resin can be infiltrated into a timber or applied to the surface of a timber. A plurality of timbers is joined together using an epoxy resin and is then solidified into a desired shape. It is preferable that the impregnation factor of the epoxy resin range from 5 weight-percent to 50 weight-percent. Specifically, the impregnation factor of the epoxy resin needs to range from 10 weight-percent to 40 weight-percent, and it optimally ranges from 20 weight-percent to 30 weight-percent. Over 50 weight-percent of the impregnation factor makes it difficult for timbers to coordinate with each other in the fiber-aligning direction. Less than 5 weight-percent of the impregnation factor decreases the adhesive strength between timbers.

As the epoxy resin, it is possible to use bisphenol-A, bisphenol-F, bisphenol-AD, novolac, and biphenyl, for example.

The specific gravity of the acoustic timber needs to agree with a target value of specific gravity of a certain natural timber to be simulated. Upon simulating the specific gravity of granadilla, for example, it is preferable that the specific gravity of the acoustic timber range from 0.8 to 1.4. Specifically, the specific gravity of the acoustic timber needs to range from 0.9 to 1.3, and it optimally ranges from 1.0 to 1.2. The acoustic timber whose specific gravity deviates from the above range may degrade sound quality. The specific gravity is adjusted by controlling pressure applied to the acoustic timber subjected to compressive molding. Alternatively, the specific gravity is adjusted by forming cells (or bubbles) inside the acoustic timber subjected to foam molding.

FIG. 1 is a cross-sectional view of an acoustic timber 1 including a plurality of woody fibers 2 according to a first embodiment of the present invention. As shown in FIG. 1, the woody fibers 2 are solidified and molded using an epoxy resin 3, wherein they are uniformly aligned in a fiber-aligning direction D1. The epoxy resin 3 is partially impregnated into the woody fibers 2, or the epoxy resin 3 is applied to the surface of each woody fiber 2.

Figure 2:
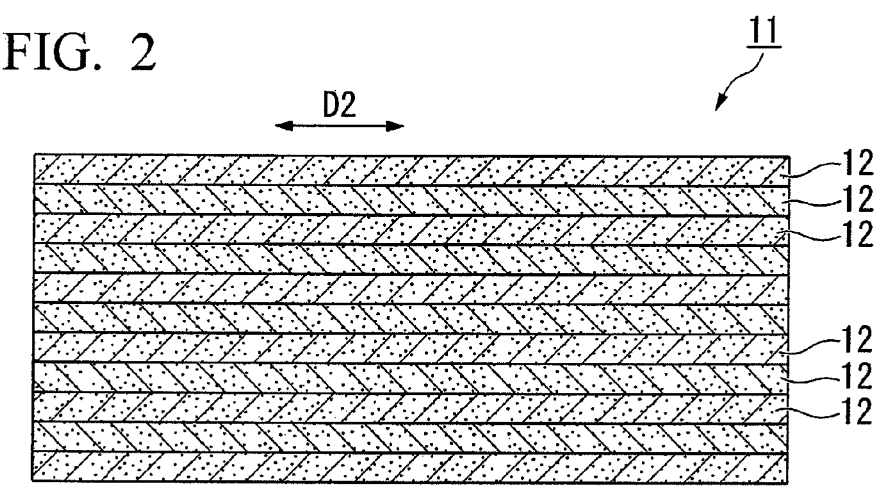
FIG. 2 is a cross-sectional view of an acoustic timber including woody veneers according to a second embodiment of the present invention.

FIG. 2 is a cross-sectional view of an acoustic timber 11 including a plurality of woody veneers 12 according to a second embodiment of the present invention. As shown in FIG. 2, the woody veneers 12 are laminated and bonded together using an epoxy resin, wherein they are uniformly aligned in a longitudinal direction D2. The epoxy resin is impregnated into the woody veneers 12 so that the woody veneers 12 join together via the epoxy resin applied to the surfaces of adjacent ones. The epoxy resin may be applied to only the surface of each woody veneer 12.

Next, a manufacturing method of an acoustic timber according to the present invention will be described below.

First, a plurality of woody members such as woody fibers or woody veneers with a fiber length of 50 mm or more is prepared in advance.

The woody members are soaked in a solution of an unhardened epoxy resin. The unhardened epoxy resin is diluted with a solvent at the concentration of 10 weight-percent through 70 weight-percent, preferably at the concentration of 20 weight-percent through 60 weight-percent. A low concentration of the diluted epoxy resin decreases the adhesive strength undesirably, while a high concentration of the diluted epoxy resin increases the viscosity of the solution, thus making it difficult to handle the solution and to impregnate the epoxy resin into the woody members. The woody members are soaked into the solution for a long time so that the unhardened epoxy resin is impregnated into the woody members with an impregnation factor of 5 weight-percent through 50 weight-percent. The impregnation factor of the epoxy resin impregnated into the woody members is adjusted by controlling the concentration of the epoxy resin diluted with the solvent or by controlling the soaking time. In this connection, it takes a short time to impregnate the epoxy resin into the woody veneers which are soaked in the solution in a decompressed atmosphere.

The woody members impregnated with the epoxy resin are dried in the atmosphere so as to completely remove the solvent therefrom. The drying time is suitably adjusted so as to completely eliminate the solvent from the woody members.

The woody members impregnated with the epoxy resin are put into the molding equipment such that they are uniformly aligned in the fiber-aligning direction. Specifically, the molding equipment is filled with woody fibers uniformly aligned in the fiber-aligning direction. Woody veneers are laminated and uniformly aligned in the fiber-aligning direction and are then put into the molding equipment.

The woody members are subjected to heating and compressive molding in the molding equipment so that they are formed in the desired shape while the epoxy resin is hardened. As to the condition of heating and compressive molding, the heating temperature ranges from the hardening temperature of the epoxy resin to the decomposition temperature of the epoxy resin, the surface pressure is set to 10 MPa, and the pressurization time is set to sixty minutes, for example. The specific gravity of the acoustic timber is adjusted during the compressive molding. Preferably, the surface pressure is adjusted so that the specific gravity falls within the range of 0.8 through 1.4. Alternatively, a foaming agent is added to the molding equipment filled with the woody members during the heating and compressive molding, wherein the woody members are subjected to foaming during the compressive molding so that cells (or bubbles) are formed inside the acoustic timber, thus adjusting the specific gravity.

Next, another manufacturing method of the acoustic timber will be described below.

The unhardened epoxy resin and the woody members which are uniformly aligned in the fiber-aligning direction are put into the molding equipment and are then subjected to heating and compressive molding.

First, a plurality of woody members with the fiber length of 50 mm or more is prepared in advance. As woody members, it is possible to use either woody fibers or woody veneers.

Woody members are uniformly aligned in the fiber-aligning direction and are put into the molding equipment. Specifically, the molding equipment is filled with woody fibers which are uniformly aligned in the fiber-aligning direction. Alternatively, woody veneers which are uniformly aligned in the fiber-aligning direction are laminated together and are then put into the molding equipment.

The molding equipment is filled with an unhardened epoxy resin in addition to the woody members. It is possible to form the unhardened epoxy resin in various shapes such as powder, lumps, and fillers. It is preferable that the average particle diameter of the epoxy resin range from 0.01 mm to 2 mm, and it is optimal that the average particle diameter of the epoxy resin range from 0.05 mm to 0.5 mm. The epoxy resin of very small average particle diameter is not preferable because it is difficult to handle and is not preferable. The epoxy resin of very large average particle diameter is not preferable because it may allow cells (or bubbles) to remain during the compressive molding so that the specific gravity thereof will decrease. The mixture composed of the epoxy resin and the woody members is prepared in advance and is then put into the molding equipment. Alternatively, the epoxy resin and the woody members are independently put into the molding equipment so as to form the mixture therein. The present embodiment does not need to dissolve the epoxy resin with the solvent; hence, it eliminates the step for removing the solvent. The impregnation factor of the epoxy resin impregnated into the acoustic timber is adjusted by controlling the mixing ratio of the epoxy resin.

The woody members and the epoxy resin are subjected to heating and compressive molding in the molding equipment so that they are joined together in a desired shape while the epoxy resin is hardened simultaneously, thus producing the acoustic timber for use in a musical instrument.

Since a plurality of woody members is aligned in the fiber-aligning direction, the acoustic timber of the present embodiment achieves good anisotropy as natural timbers, thus yielding good sound quality as natural timbers. The epoxy resin included in the acoustic timber contributes to high adhesive strength, high acoustic velocity, and low underdamping factor (tans), and it also reduces dimensional variations due to absorption and desorption of moisture which is unique to conventional timbers.

Since the impregnation factor of the epoxy resin is controlled within the range of 5 weight-percent through 50 weight-percent, the woody members are easily aligned in the fiber-aligning direction; hence, it is possible to improve the adhesive strength between the woody members, thus improving the strength of the acoustic timber.

Since the specific gravity is controlled within the range of 0.8 through 1.4, the specific gravity of the acoustic timber agrees with the target value of specific gravity of natural timbers, thus improving the sound quality.

The acoustic timber of the present embodiment is preferably used as a constituent member of acoustic musical instruments. Specifically, the acoustic timber of the present embodiment is suitable for woodwind instruments such as clarinets, oboes, piccolos, and recorders. In addition, the acoustic timber of the present embodiment can be used as a substitute material for woody parts used in any types of musical instruments such as stringed instruments and percussion instruments.

Any types of acoustic musical instruments can be produced using the acoustic timber of the present embodiment substituted for conventional timbers in accordance with the usual method. Compared to conventional musical instruments using natural timbers, musical instruments using the acoustic timber of the present embodiment demonstrate equivalent or higher sound quality without having individual differences.

In addition, the acoustic timber of the present embodiment is suitable for any types of acoustic materials such as diaphragms of speakers and speaker boxes.

Furthermore, the manufacturing method of the present embodiment stipulates that the woody members are uniformly aligned in the fiber-aligning direction and are then subjected to heating and compressive molding; hence, the acoustic timber of the present embodiment achieves good anisotropy as natural timbers and also demonstrates the equivalent sound quality as natural timbers.

By way of experiments, the present inventors produced various examples of acoustic timbers, which were compared with each other so as to verify the validity and significance of the present invention.

(a) EXAMPLE 1

First, blasted bamboo fibers with an average thickness of 0.3 mm were cut into pieces with a fiber length of 500 mm. Blasted bamboo fibers whose fiber lengths were prepared in advance were soaked into an acetone-methanol mixed solution which included a hardening agent and an unhardened epoxy resin (e.g. JER828 manufactured by Japan Epoxy Resins Co. Ltd.) at a concentration of 50 weight-percent, wherein the final impregnation factor of the epoxy resin was adjusted by controlling the soaking time. Blasted bamboo fibers were extracted from the solution at a suitable time when adequately impregnated with the epoxy resin and then dried in the atmosphere for one day.

Thereafter, blasted bamboo fibers impregnated with the epoxy resin which were uniformly aligned in the fiber-aligning direction were put into the molding equipment and were then subjected to heating and compressive molding under the desired condition, i.e. at the heating temperature of 200° C., the surface pressure of 10 MPa, and the pressurized time of sixty minutes, thus producing an acoustic timber of a rectangular parallelepiped shape in the desired dimensions of 500 mm×40 mm×40 mm. In this connection, the fiber-aligning direction of blasted bamboo fibers agreed with the longitudinal direction of the acoustic timber.

(b) EXAMPLE 2

First, defibrated bamboo fibers with the average thickness of 0.5 mm were cut into pieces with the fiber length of 50 mm. These bamboo fibers were mixed with a hardening agent and powder in which an unhardened epoxy resin (e.g. JER1002 manufactured by Japan Epoxy Resins Co. Ltd.) was ground into particles with the average particle diameter of 0.1 mm. The final impregnation factor of the epoxy resin was adjusted by controlling the mixing ratio of the epoxy resin with bamboo fibers. Then, bamboo fibers impregnated with the epoxy resin were put into the molding equipment such that they were uniformly aligned in the fiber-aligning direction.

Bamboo fibers impregnated with the epoxy resin were subjected to heating and compressive molding under the desired condition, i.e. at the heating temperature of 200° C., the surface pressure of 10 MPa, and the pressurized time of sixty minutes, thus producing an acoustic timber of a rectangular parallelepiped shape in the desired dimensions of 500 mm×40 mm×40 mm. In this connection, the fiber-aligning direction of defibrated bamboo fibers agreed with the longitudinal direction of the acoustic timber.

(c) EXAMPLE 3

A birch veneer of 500 mm×40 mm was prepared and sliced with the thickness of 0.6 mm, wherein the fiber-aligning direction agreed with the longitudinal direction. The birch veneer was soaked into an acetone-methanol mixed solution which included a hardening agent and an unhardened epoxy resin (e.g. JER828 manufactured by Japan Epoxy Resins Co. Ltd.) with a concentration of 50 weight-percent. Then, the birch veneer soaked in the above solution was decompressed and was impregnated with the epoxy resin in the vacuum condition. The final impregnation factor of the epoxy resin was adjusted by controlling the soaking time. The birth veneer was extracted from the solution at a suitable time when adequately impregnated with the epoxy resin and then dried in the atmosphere for one day.

Ninety birch veneers impregnated with the epoxy resin which were uniformly aligned in the fiber-aligning direction were put into the molding equipment and subjected to heating and compressive molding under the desired condition, i.e. at the heating temperature of 200° C., the surface pressure of 10 MPa, and the pressurized time of sixty minutes, thus producing an acoustic timber of a rectangular parallelepiped shape in the desired dimensions of 500 mm×40 mm×40 mm. In this connection, the fiber-aligning direction of birch veneers agreed with the longitudinal direction of the acoustic timber.

(d) COMPARATIVE EXAMPLE 1

An acoustic timber of Comparative Example 1 was produced in accordance with the Example 2, except that the fiber length of bamboo fibers was changed to 30 mm.

(e) COMPARATIVE EXAMPLE 2

An acoustic timber of Comparative Example 2 was produced in accordance with the Example 2, except that bamboo fibers were aligned in random directions.

(f) COMPARATIVE EXAMPLE 3

An acoustic timber of Comparative Example 3 was produced in accordance with the Example 3, except that an unhardened thermosetting resin of a liquid melamine resin was substituted for the unhardened epoxy resin, and the birch veneer was subjected to heating and compressive molding at the temperature of 130° C. and the surface pressure of 7 MPa.

Figure 3:
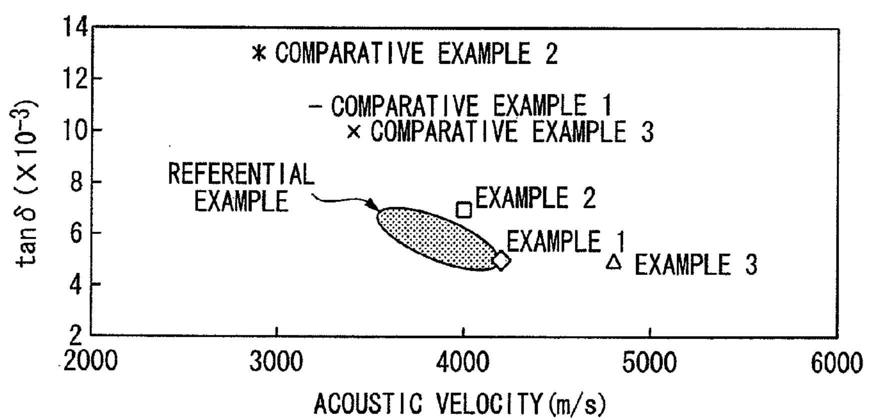
FIG. 3 is a graph showing underdamping factors relative to the acoustic velocity with respect to various examples of acoustic timbers.

Characteristic data are shown in Table 1 and FIG. 3 with respect to the acoustic timbers according to Examples 1-3 (namely, E 1-E3) and Comparative Examples 1-3 (namely, C1-C3). Table 1 refers to the resin type, the impregnation factor $F_{imp}$ (weight-percent), the timber type, the fiber length (Length) (mm), the fiber-aligning direction (Alignment) which is "uniform" (or regular) or "random", the specific gravity ρ, the acoustic velocity V (m/s), and the underdamping factor $F_{damp}$ (tan δ). The acoustic velocity V and the underdamping factor $F_{damp}$ are produced by way of the following procedure.

An elasticity modulus is estimated based on the resonance frequency of the primary double-end free deflection vibration in accordance with the free oscillation method using an FFT analyzer (e.g. DS2000 manufactured by Ono Sokki Co. Ltd.). The acoustic velocity $E/\rho^{1/2}$ is calculated based on the elasticity modulus and the specific gravity ρ. The underdamping factor $F_{damp}$ (tan δ) is calculated based on the resonance peak time envelope of the primary vibration. Both the acoustic velocity V and the underdamping factor $F_{damp}$ are measured along the fiber-aligning direction of an acoustic timber. The measurement is performed in a room at 22° C. and 60% RH (relative humidity). Table 1 and FIG. 3 additionally refer to a referential example (Ref), i.e. an acoustic timber composed of granadilla.

TABLE 1

| | Resin | | Timber | | | | | $F_{damp}$ |
|---|---|---|---|---|---|---|---|---|
| | Type | $F_{imp}$ | Type | Length | Alignment | ρ | V | ($\times10^{-3}$) |
| E1 | Epoxy | 30 | Blasted Bamboo | 500 | Uniform | 1.18 | 4,200 | 5 |
| E2 | Epoxy | 30 | Defibrated Bamboo | 50 | Uniform | 1.20 | 4,000 | 7 |
| E3 | Epoxy | 30 | Birch Veneer | 500 | Uniform | 1.20 | 4,800 | 5 |
| C1 | Epoxy | 30 | Defibrated Bamboo | 30 | Uniform | 1.16 | 3,200 | 11 |
| C2 | Epoxy | 30 | Defibrated Bamboo | 50 | Random | 1.15 | 2,900 | 13 |
| C3 | Melamine | 30 | Birch Veneer | 500 | Uniform | 1.20 | 3,400 | 10 |
| Ref | — | — | Granadilla | 500 | Uniform | — | 3,500-4,200 | 5-7 |

Table 1 and FIG. 3 clearly shows the high acoustic velocity of 4,000 m/s through 4,800 m/s and the low underdamping factor of $5\times10^{-3}$ through $7\times10^{-3}$ along the fiber-aligning direction. In particular, the acoustic timbers of Examples 1 and 2 show good values of the acoustic velocity and the underdamping factor which are close to those of the natural granadilla; hence, they yield good sound quality as natural timbers.

The inventors verified that the clarinets, which were produced by cutting the acoustic timbers of Examples 1-3, demonstrated good tone colors.

Compared to the acoustic timbers of Examples 1-3, the acoustic timbers of Comparative Examples 1-3 are lower in terms of the acoustic velocity and are increased in the underdamping factor. This is because the acoustic timber of Comparative Example 1 had short lengths of bamboo fibers, the acoustic timber of Comparative Example 2 had the random fiber-aligning direction of bamboo fibers, and the acoustic timber of Comparative Example 3 substituted the melamine resin for the epoxy resin.

The inventors verified that the clarinets, which were produced by cutting the acoustic timbers of Comparative Examples 1-3, were degraded in tone color in comparison with the clarinets composed of the acoustic timbers of Examples 1-3.

Lastly, the present invention is not necessarily limited to the above embodiments and examples, which can be further modified in various ways within the scope of the invention as defined in the appended claims.

What is claimed is:

1. An acoustic timber comprising:

a plurality of woody members including fibers with a fiber length of 50 mm or more; and an epoxy resin that is impregnated into the woody members with an impregnation factor of 5 weight-percent through 50 weight-percent, wherein the woody members impregnated with the epoxy resin are joined together such that the fibers thereof are uniformly aligned in a desired fiber-aligning direction.

2. The acoustic timber according to claim 1, wherein the woody members are each composed of woody fibers or a woody veneer.

3. The acoustic timber according to claim 1, wherein the woody members are each composed of blasted bamboo fibers or defibrated bamboo fibers.

4. A manufacturing method of an acoustic timber comprising:

preparing a plurality of woody members including fibers with a fiber length of 50 mm or more;

unifying the woody members by impregnating an unhardened epoxy resin with an impregnation factor of 5 weight-percent through 50 weight-percent;

uniformly align the fibers of the woody members in a desired fiber-aligning direction; and subjecting the woody members to heating and compressive molding.

5. An acoustic musical instrument composed of an acoustic timber, including:

a plurality of woody members including fibers with a fiber length of 50 mm or more; and an epoxy resin that is impregnated into the woody members with an impregnation factor of 5 weight-percent through 50 weight-percent, wherein the woody members impregnated with the epoxy resin are joined together such that the fibers thereof are uniformly aligned in a desired fiber-aligning direction.

* * * * *